US011787528B2

(12) United States Patent
Liu et al.

(10) Patent No.: US 11,787,528 B2
(45) Date of Patent: Oct. 17, 2023

(54) JAM FREE DUAL-REDUNDANT ACTUATOR LANE CHANGER SYSTEM AND PROCESS

(71) Applicant: Whippany Actuation Systems LLC, Whippany, NJ (US)

(72) Inventors: Shijie Liu, Florham Park, NJ (US); Kurt Goldhammer, Long Branch, NJ (US); Douglas Campbell, Martinsville, NJ (US); Philip DeMauro, Toms River, NJ (US); Michael Doyle, Lincoln Park, NJ (US); Alan Powers, Hopatcong, NJ (US); Philip Chivily, Verona, NJ (US)

(73) Assignee: Whippany Actuation Systems LLC, Whippany, NJ (US)

( * ) Notice: Subject to any disclaimer, the term of this patent is extended or adjusted under 35 U.S.C. 154(b) by 357 days.

(21) Appl. No.: 17/132,415

(22) Filed: Dec. 23, 2020

(65) Prior Publication Data
US 2022/0194560 A1    Jun. 23, 2022

(51) Int. Cl.
*B64C 13/50* (2006.01)
*F16H 37/06* (2006.01)
*F16H 25/20* (2006.01)

(52) U.S. Cl.
CPC ......... *B64C 13/505* (2018.01); *F16H 37/065* (2013.01); *F16H 2025/209* (2013.01); *F16H 2025/2087* (2013.01)

(58) Field of Classification Search
CPC ....... F16H 2025/209; F16H 2025/2087; F16H 37/065; B64C 13/505
USPC ....................................................... 74/89.26
See application file for complete search history.

(56) References Cited

U.S. PATENT DOCUMENTS

| 2,809,736 | A | * | 10/1957 | Hoover | B64C 13/00 318/45 |
| 3,406,719 | A | | 10/1968 | Jenney | |
| 4,945,779 | A | | 8/1990 | Williams | |
| 6,349,900 | B1 | | 2/2002 | Uttley et al. | |
| 7,021,587 | B1 | * | 4/2006 | Younkin | G05D 1/0077 244/99.3 |
| 7,607,611 | B2 | | 10/2009 | Wingett et al. | |
| 7,834,494 | B2 | * | 11/2010 | Blanding | H02K 7/108 310/68 B |
| 8,070,094 | B2 | | 12/2011 | Collins | |
| 8,267,350 | B2 | | 9/2012 | Elliott et al. | |
| 9,163,648 | B2 | | 10/2015 | Kim et al. | |
| 2007/0068291 | A1 | * | 3/2007 | Beatty | H02K 7/06 74/89.26 |

(Continued)

OTHER PUBLICATIONS

International Patent Application No. PCT/US2021/062769; Int'l Search Report and the Written Opinion; dated Mar. 2, 2022; 21 pages.

*Primary Examiner* — Victor L MacArthur
*Assistant Examiner* — David M Fenstermacher
(74) *Attorney, Agent, or Firm* — BakerHostetler

(57) ABSTRACT

A jam free dual redundant actuator lane changer system includes a primary lane system and a secondary lane system. The primary lane system is configured to provide actuation of a component during a normal operation while the secondary lane system remains in a standby configuration; and the secondary lane system is configured to provide an actuation of the component when the primary lane system fails or jams, but freed from its output to the component.

33 Claims, 14 Drawing Sheets

(56) References Cited

U.S. PATENT DOCUMENTS

| | | | |
|---|---|---|---|
| 2011/0048147 A1* | 3/2011 | Keech | F16H 25/205 |
| | | | 74/89.26 |
| 2012/0259483 A1* | 10/2012 | Villano | B64C 13/505 |
| | | | 701/100 |
| 2012/0290153 A1* | 11/2012 | Olsoe | G05D 1/0077 |
| | | | 701/3 |
| 2018/0087634 A1* | 3/2018 | Muster | B64C 25/24 |
| 2020/0156766 A1* | 5/2020 | Tzabari | B64C 9/02 |
| 2020/0290729 A1* | 9/2020 | Charafeddine | B64C 13/30 |

\* cited by examiner

JAM FREE DUAL-REDUNDANT ACTUATOR LANE CHANGER SYSTEM AND PROCESS

FIELD OF THE DISCLOSURE

The disclosure relates to a jam free dual-redundant actuator lane changer system. The disclosure also relates to a jam free dual-redundant actuator lane changer process. More particularly, the disclosed system and process allows an electro-mechanical dual-redundant actuator with an active and/or standby configuration to disengage a jammed and/or failed active and/or primary lane and engage a standby and/or secondary lane of the jam free dual-redundant actuator.

The disclosure further relates to a jam free dual-redundant actuator lane changer system implemented in an aircraft and/or aerospace application or any application requiring a jam free actuation system. The disclosure also relates to a jam free dual-redundant actuator lane changer process implemented in an aircraft and/or aerospace application or any applications requiring a jam free actuation system. More particularly, the disclosed system and process allows an electro-mechanical dual-redundant actuator in an aircraft and/or aerospace application or any application which requires a jam free actuation system with an active and/or standby configuration to disengage a jammed and/or failed active and/or primary lane and engage a standby and/or secondary lane of the jam free dual-redundant actuator.

BACKGROUND OF THE DISCLOSURE

The predominant actuation technology currently used in aircraft and/or aerospace applications is hydraulic. For example, the predominant flight surface control technology used today is hydraulic. In this regard, a hydraulic actuator can readily incorporate dual redundancy. However, a hydraulic actuator also has many inherent problems. For example, a typical hydraulic actuation system has problems such as leaking, high weight penalty, high demand maintenance, higher failure rate, and so on.

Electro-mechanical actuation (EMA) is being required more and more by the aircraft industry due to its inherent low cost, advantageous low weight, and/or the like. This increased demand for EMA is extending into high reliability applications and/or critical applications, such as aerospace flight controls. Actuator failure in high reliability applications and/or critical applications is very undesirable and may present a safety concern as well as the possibility of equipment damage.

Accordingly, in order to address the need for low failure rates, dual-redundant actuators are employed. However, a limitation of many dual-redundant actuation system design configurations is a situation where they only offer electrical/electronic redundancy; and do not provide a jam free dual redundant mechanism. That means that if one actuator mechanical lane becomes jammed, and the second lane is also jammed. This is because they are both hard linked to the same structural member; consequently, the jammed or failed component in one lane is effectively the same failed component for the second lane.

Accordingly, it would be desirable to have an actuator with a jam free redundant system and/or redundant actuator process to circumvent a lane jam. This ability for dual redundant electro-mechanical actuator to circumvent mechanical failures is critical to achieve a higher reliability, increase safety, limit equipment damage, and/or the like.

SUMMARY OF THE DISCLOSURE

The foregoing needs are met, to a great extent, by the disclosure, which describes a jam free dual-redundant actuator lane changer system and/or a dual-redundant actuator lane changer process.

One aspect of the disclosure includes a jam free dual redundant actuator lane changer system that includes a primary lane system; and a secondary lane system, where the primary lane system is configured to provide actuation of a component during a normal operation while the secondary lane system remains in a standby configuration; and where the secondary lane system is configured to provide actuation of the component when the primary lane system fails or jams.

One aspect of the disclosure includes a jam free dual redundant actuator lane changer system that includes a primary lane system; a secondary lane system; the primary lane system is configured to provide actuation of a component during a normal operation while the secondary lane system remains in a standby configuration; a sensor configured to sense a failure of the primary lane system; and a controller configured to control the secondary lane system to provide actuation of the component in response to the sensor sensing the failure of the primary lane system.

There has thus been outlined, rather broadly, certain aspects of the disclosure in order that the detailed description thereof may be better understood herein, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
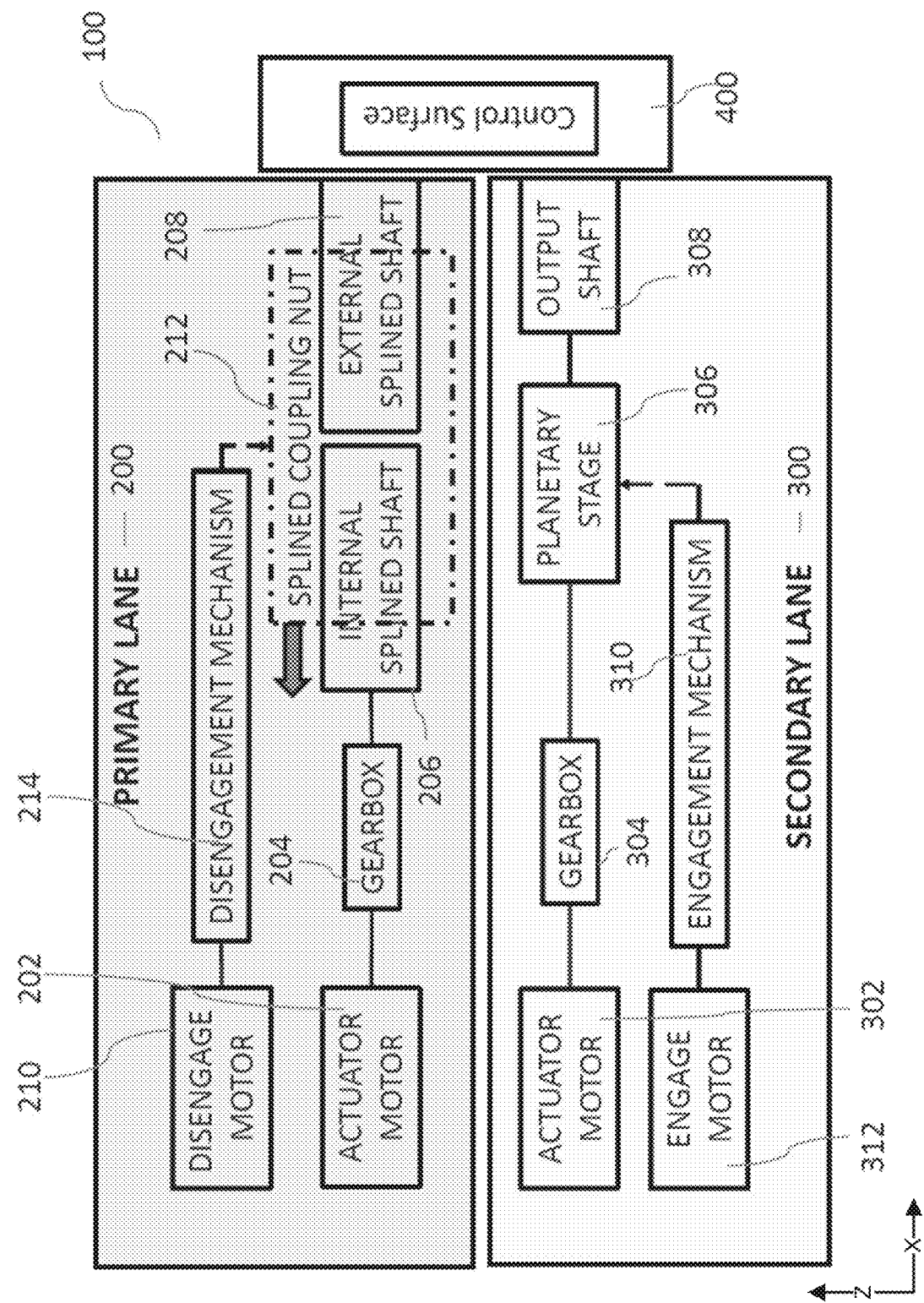
FIG. 1 illustrates a schematic of a jam free dual redundant actuator lane changer system according to an aspect of the disclosure.

The disclosure will now be described with reference to the drawing figures, in which like reference numerals refer to like parts throughout. Various aspects of the disclosure advantageously provide a transmission that provides redundant drives for an actuator.

FIG. 1 illustrates a schematic of a jam free dual redundant actuator lane changer system according to an aspect of the disclosure.

In this regard, FIG. 1 illustrates via a block diagram, the key elements of a jam free dual redundant actuator lane changer system according to an aspect of the disclosure. In particular, FIG. 1 illustrates a jam free dual redundant actuator lane changer system 100. The jam free dual redundant actuator lane changer system 100 may include a primary lane system 200 and a secondary lane system 300. The jam free dual redundant actuator lane changer system 100 may operate to actuate a component 400.

In one aspect, the jam free dual redundant actuator lane changer system 100 may be configured to actuate the component 400 that includes, is connected to, and/or operates a control surface, a flight surface for an aircraft, and/or the like. In one aspect, the jam free dual redundant actuator lane changer system 100 may be configured to actuate a flight surface for an aircraft including one or more of an aileron, an elevator, a rudder, a ruddervator, leading-edge flaps, leading-edge slats, ground spoilers, an inboard flap, an inboard aileron, an inboard aileron tab, an outboard flap, a balance tab, an outboard aileron, a flight spoiler, a trim tab, slats, air brakes, an elevator trim, a control horn, a rudder trim, an aileron trim, and/or the like. In one aspect, the actuator may be configured to actuate a component for an aircraft such as thrust reversers, weapons systems, in-flight fueling systems, tail hook arrest systems, landing gear systems, doors, hatches, and/or the like. In this regard, the jam free dual redundant actuator lane changer system 100 is especially configured and/or beneficial to aircraft systems where reliability, weight, and/or the like are of greater importance.

The jam free dual redundant actuator lane changer system 100 may include a primary lane actuation motor 202, a primary lane gearbox 204, a splined internal output shaft 206, a splined external output shaft 208, a primary lane disengage motor 210, a primary lane splined coupling nut 212, a primary lane disengagement mechanism that may include a wheel 214, a secondary lane actuator motor 302, a secondary lane gearbox 304, a secondary lane planetary output stage 306, a secondary lane output shaft 308, a secondary lane engagement mechanism 310, and a secondary lane engage motor 312. However, the jam free dual redundant actuator lane changer system 100 may be implemented with fewer components, a greater number of components, and/or different components providing equivalent functionality.

In this regard, the primary lane system 200 may include one or more of the primary lane actuation motor 202, the primary lane gearbox 204, the splined internal output shaft 206, the splined external output shaft 208, the primary lane disengage motor 210, the primary lane splined coupling nut 212, and the primary lane disengagement mechanism that may include a wheel 214. In particular, the primary lane system 200 may be implemented to provide actuation of the component 400 during typical normal operations while the secondary lane system 300 remains in a standby configuration. More specifically, the primary lane system 200 may be implemented in an active configuration to provide actuation of the component 400 during typical normal operations while the secondary lane system 300 remains in a standby configuration. Additionally, the primary lane system 200 may be implemented with fewer components, a greater number of components, and/or different components providing equivalent functionality.

On the other hand, the secondary lane system 300 may include one or more of the secondary lane actuator motor 302, the secondary lane gearbox 304, the secondary lane planetary output stage 306, the secondary lane output shaft 308, the secondary lane engagement mechanism 310, and the secondary lane engage motor 312. In particular, the secondary lane system 300 may be implemented to provide actuation of the component 400 when the primary lane system 200 fails, jams, and/or the like. Additionally, the secondary lane system 300 may be implemented with fewer components, a greater number of components, and/or different components providing equivalent functionality.

More specifically, the jam free dual redundant actuator lane changer system 100 may operate in the active configuration to operate the component 400 by implementing the primary lane system 200. When the primary lane system 200 fails, jams, and/or the like, the jam free dual redundant actuator lane changer system 100 may be operated to be placed in a fault tolerance configuration to disconnect the primary lane system 200 from the component 400 and connect the secondary lane system 300 to the component 400. Thereafter, the secondary lane system 300 of the jam free dual redundant actuator lane changer system 100 operates the component 400.

Figure 2:
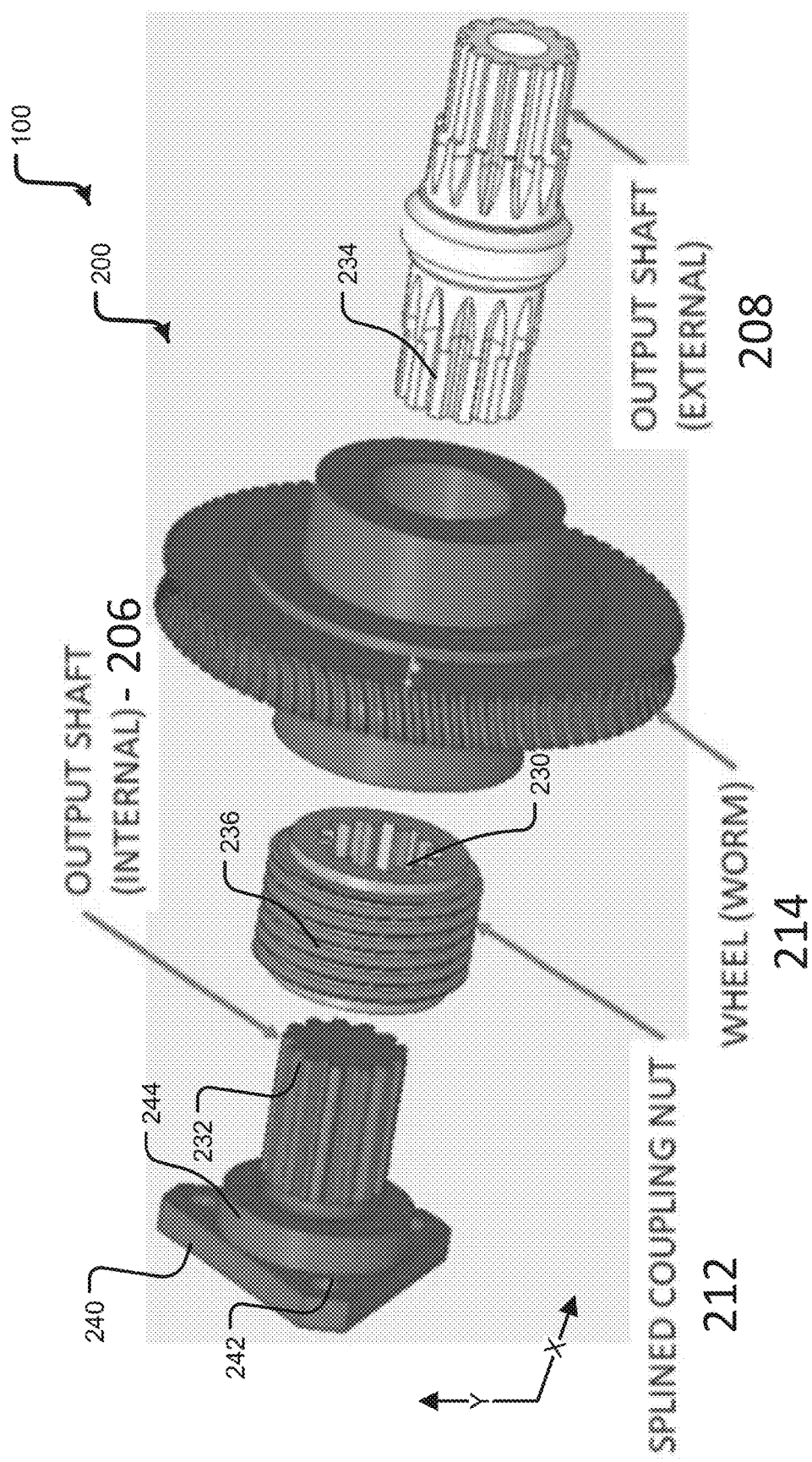
FIG. 2 illustrates a partial perspective exploded view of a primary lane system of FIG. 1.

FIG. 2 illustrates a partial perspective exploded view of a primary lane system of FIG. 1.

Figure 3:
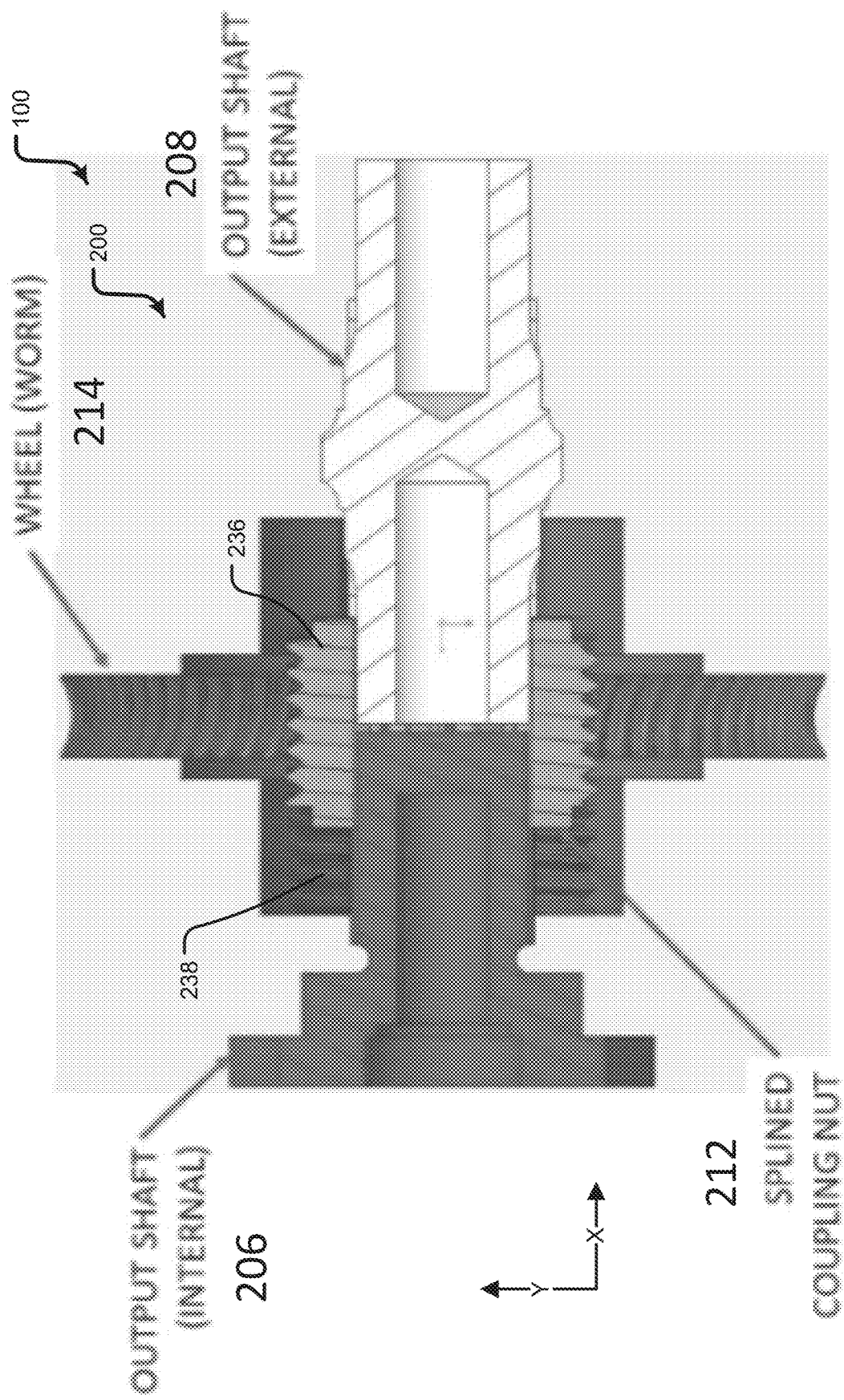
FIG. 3 illustrates a cross-sectional side view of the assembly view of primary lane system of FIG. 2.

FIG. 3 illustrates a cross-sectional side view the assembly view of FIG. 2.

With reference to FIG. 2 and FIG. 3, the primary lane system 200 may include a rotating spline output shaft that may be split in two sections, which allows the rotating spline output shaft to be disengaged if a failure is detected. More specifically, the rotating spline output shaft of the primary lane system 200 may include the splined internal output shaft 206 and the splined external output shaft 208. The primary lane splined coupling nut 212 may be configured as a nut with an internal spline 230 that may be coupled to a feature 232, such as a spline shaft, of the splined internal output shaft 206 and a spline 234 of the splined external output shaft 208. The primary lane splined coupling nut 212 may also have a thread 236 on an outside diameter. The primary lane system 200 may further include a wheel 214. The wheel 214 may include an internal thread 238 as shown in FIG. 3. The wheel 214 together with the internal thread 238, when turned, drives the primary lane splined coupling nut 212. In one aspect, the wheel 214 may be a worm wheel having worm gear teeth arranged along an outside diameter thereof. Additionally, the primary lane system 200 may be implemented with fewer components, a greater number of components, and/or different components providing equivalent functionality.

More specifically, the splined internal output shaft 206, the primary lane splined coupling nut 212, the wheel 214, and the splined external output shaft 208 may be arranged along and axis parallel to the X axis as illustrated in FIG. 2 and FIG. 3. When the primary lane system 200 is active and engaged, rotation of the splined internal output shaft 206 results in rotation of the primary lane splined coupling nut 212 and the splined external output shaft 208, which rotation is provided to the component 400 (shown in FIG. 1). In this regard, the feature 232 of the splined internal output shaft 206 engages with the internal spline 230 of the primary lane splined coupling nut 212, and the internal spline 230 of the primary lane splined coupling nut 212 is likewise engaged with the spline 234 of the splined external output shaft 208. Additionally, the splined internal output shaft 206 may be driven by the primary lane system 200 in order to provide rotation of the splined external output shaft 208 as described above. Although the primary lane system 200 including the primary lane splined coupling nut 212, the wheel 214, and the splined external output shaft 208 may be implemented along a single common axis parallel to the X axis as shown in FIG. 2 and FIG. 3, other arrangements are contemplated as well. Additionally, the primary lane system 200 may include components providing equivalent functionality.

Figure 4:
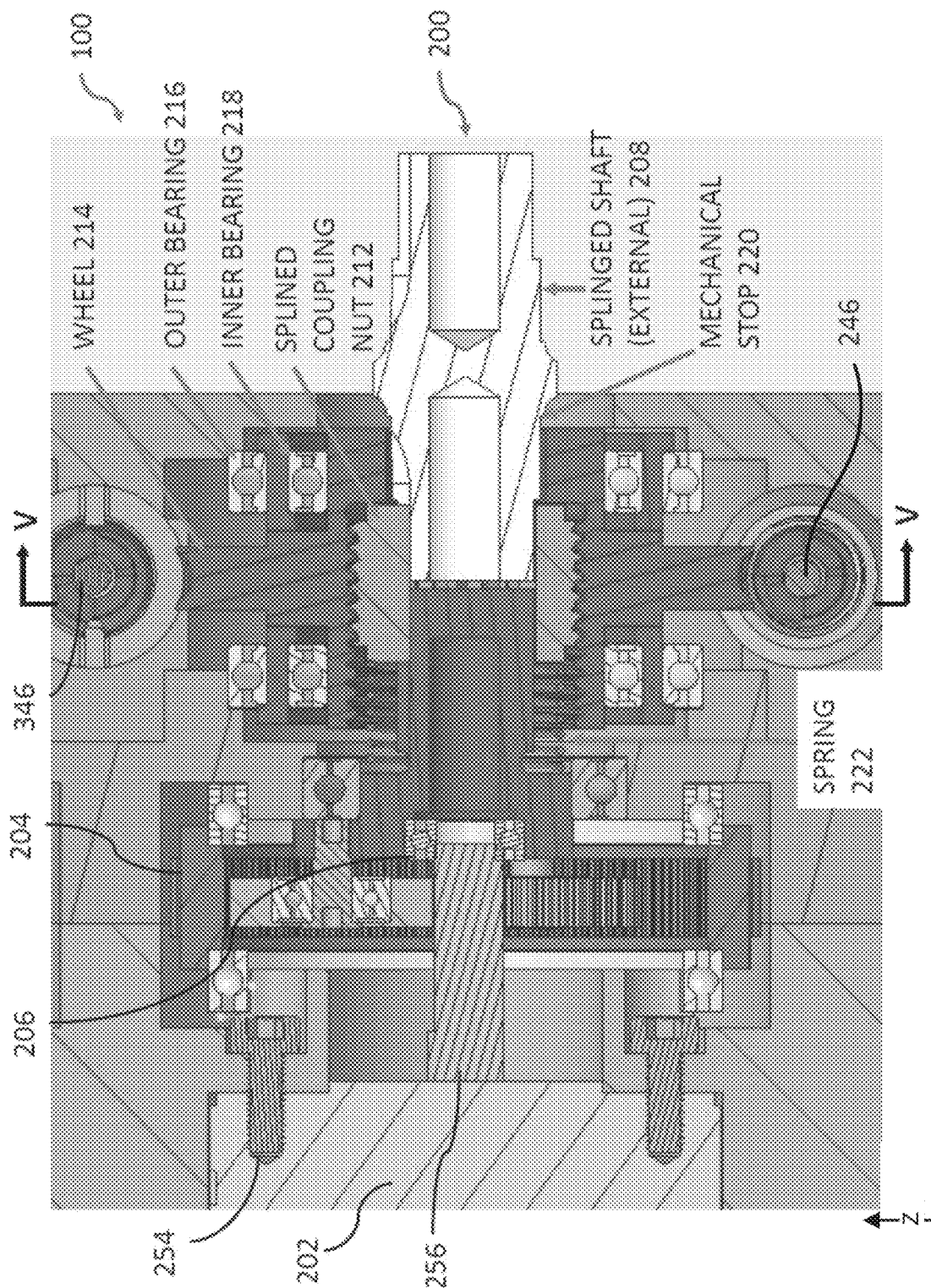
FIG. 4 illustrates a cross-sectional side view of the primary lane system in operating mode.

With further reference to FIG. 2, the splined internal output shaft 206 may include the feature 232 connected to a carrier 240. The carrier 240 may include apertures 242 for receiving mechanical fasteners for engagement with the primary lane gearbox 204 (shown in FIG. 1) and/or the primary lane actuation motor 202 (shown in FIG. 1). The splined internal output shaft 206 may further include a carrier part 244 that may be arranged between the carrier 240 and the feature 232. The carrier part 244 may engage bearings as illustrated in FIG. 4 to ensure smooth rotation and/or low friction rotation of the splined internal output shaft 206. The internal output shaft 206 can be any type of output shaft operating out of the primary lane gearbox 204, as long as it has an operative connection, such as a spline connected to the primary lane splined coupling nut 212.

FIG. 4 illustrates a further partial cross-sectional side view of the primary lane system assembly of FIG. 2.

With reference to FIG. 4, the primary lane system 200 may further include an outer bearing 216, an inner bearing 218, a mechanical stop 220, and a spring 222.

The primary lane system 200 together with one or more of the components described herein may be configured with an output engage feature/output disengage feature. In this regard, as the wheel 214 rotates about the X axis, the primary lane splined coupling nut 212 may translate linearly along the X axis toward the splined external output shaft 208 as the primary lane splined coupling nut 212 rides on the splined internal output shaft 206; the internal spline 230 acting as an anti-rotation guide. The splined external output shaft 208 may have the mechanical stop 220 arranged on an external surface of the splined external output shaft 208. Under normal operating conditions, the primary lane system 200 may be in active mode and the wheel 214 may be free to rotate. To ensure the primary lane splined coupling nut 212 remains in place during normal operation or the first configuration, the spring 222 may be installed and/or arranged so the thread friction between the internal thread 238 of the wheel 214 and the thread 236 of the primary lane splined coupling nut 212 may be greater than the friction of the wheel 214 from the outer bearing 216 and/or the inner bearing 218. In some aspects, a bearing on the wheel 214 may be important as the freewheeling the wheel 214 is critical for operation. To minimize a failure rate, a double bearing feature may be utilized that may include the outer bearing 216 and/or the inner bearing 218 that may be arranged and/or utilized as illustrated in FIG. 4.

More specifically, the splined external output shaft 208 may have a first end with the spline 234 arranged thereon for engaging the internal spline 230 of the primary lane splined coupling nut 212. The splined external output shaft 208 may further include a second end, opposite the first end, for connection and/or output to the component 400. Additionally, the splined external output shaft 208 may include the mechanical stop 220 arranged between the first end and the second end. The mechanical stop 220 may be implemented as a circumferential edge having a diameter greater than the internal diameter of the primary lane splined coupling nut 212. Accordingly, the mechanical stop 220 may prevent movement of the primary lane splined coupling nut 212 in the rightward direction along the X axis as illustrated in FIG. 4.

The spring 222 may be implemented by any type of spring structure, spring implementation, and/or spring configuration. The spring 222 may be coiled around the splined internal output shaft 206. In particular, the spring 222 may be coiled about the feature 232 portion of the splined internal output shaft 206. A first end of the spring 222 may engage between a surface of the splined internal output shaft 206 and the feature 232. A second end of the spring 222 may engage a surface of the primary lane splined coupling nut 212 between the thread 236 and the internal spline 230. The spring 222 may be configured to apply adequate force to the primary lane splined coupling nut 212 to urge the primary lane splined coupling nut 212 towards the splined external output shaft 208.

The outer bearing 216 of the wheel 214 may be arranged about the X axis to allow rotation of the wheel 214. The outer bearing 216 may be arranged circumferentially outside the inner bearing 218. In particular, the outer bearing 216 may engage a surface that also engages the inner bearing 218. The inner bearing 218 may contact a surface of the wheel 214. In particular, the inner bearing 218 may directly contact a circumferential surface of the wheel 214.

With further reference to FIG. 4, the primary lane actuation motor 202 may be connected with the primary lane gearbox 204 within the jam free dual redundant actuator lane changer system 100. Additionally, the primary lane gearbox 204 may be supported within the jam free dual redundant actuator lane changer system 100 by one or more bearings as illustrated in FIG. 4. Moreover, the splined internal output shaft 206 may be supported within the jam free dual redundant actuator lane changer system 100 by one or more bearings and may connect to an output shaft 256 of the primary lane actuation motor 202, which may be supported by one or more mechanical fasteners 254. Additionally, FIG. 4 illustrates the positioning of the screw shaft 246, and the screw shaft 346 within the jam free dual redundant actuator lane changer system 100 that are described in further detail with respect to FIG. 5 and FIG. 7.

Figure 5:
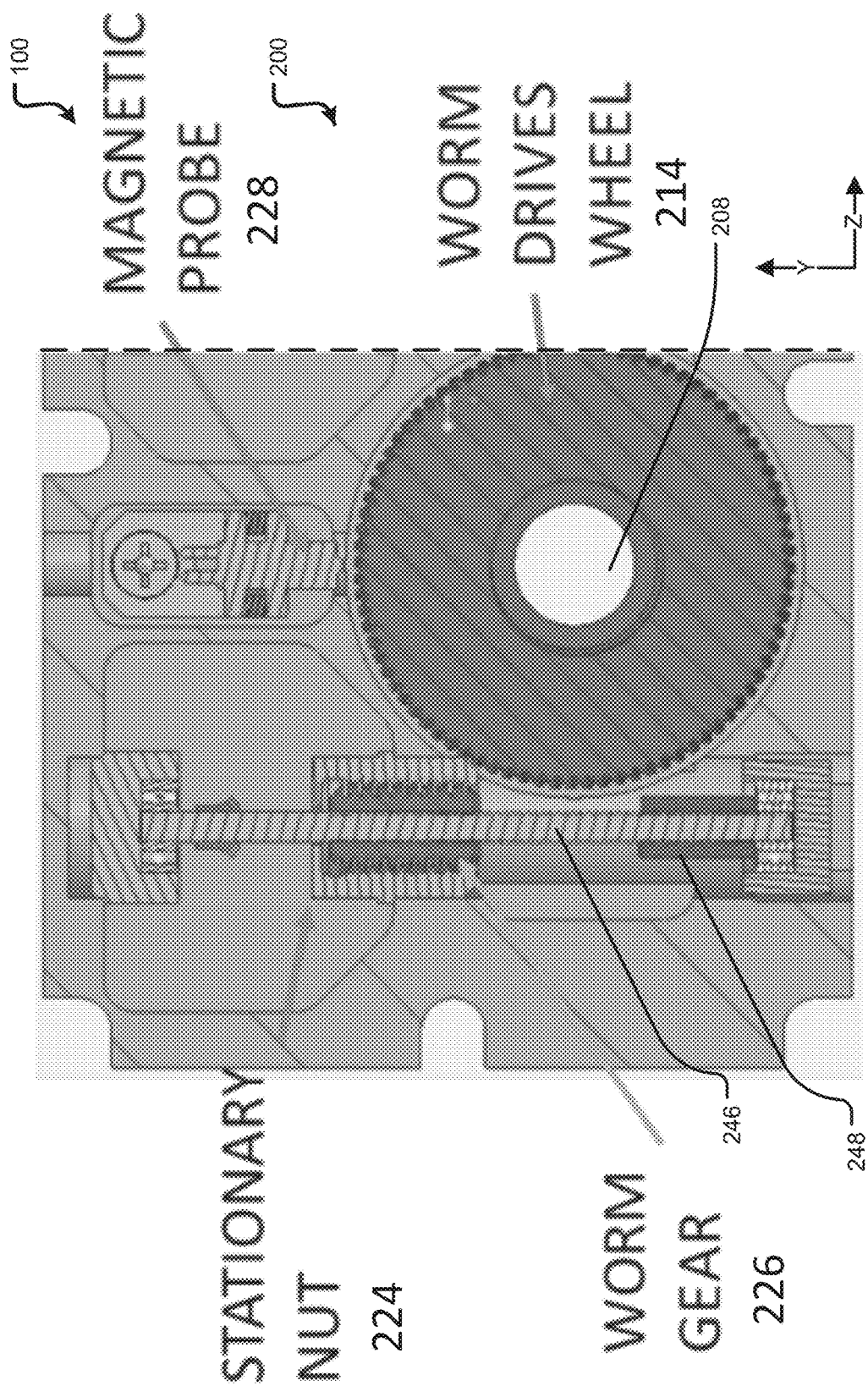
FIG. 5 illustrates a partial cross-sectional view of disengagement of mechanism along the lines V-V of the primary lane system of FIG. 4 in primary lane active mode.

FIG. 5 illustrates a partial cross-sectional view of disengagement mechanism along the lines V-V of the primary lane system of FIG. 4 in an active mode.

Figure 6:
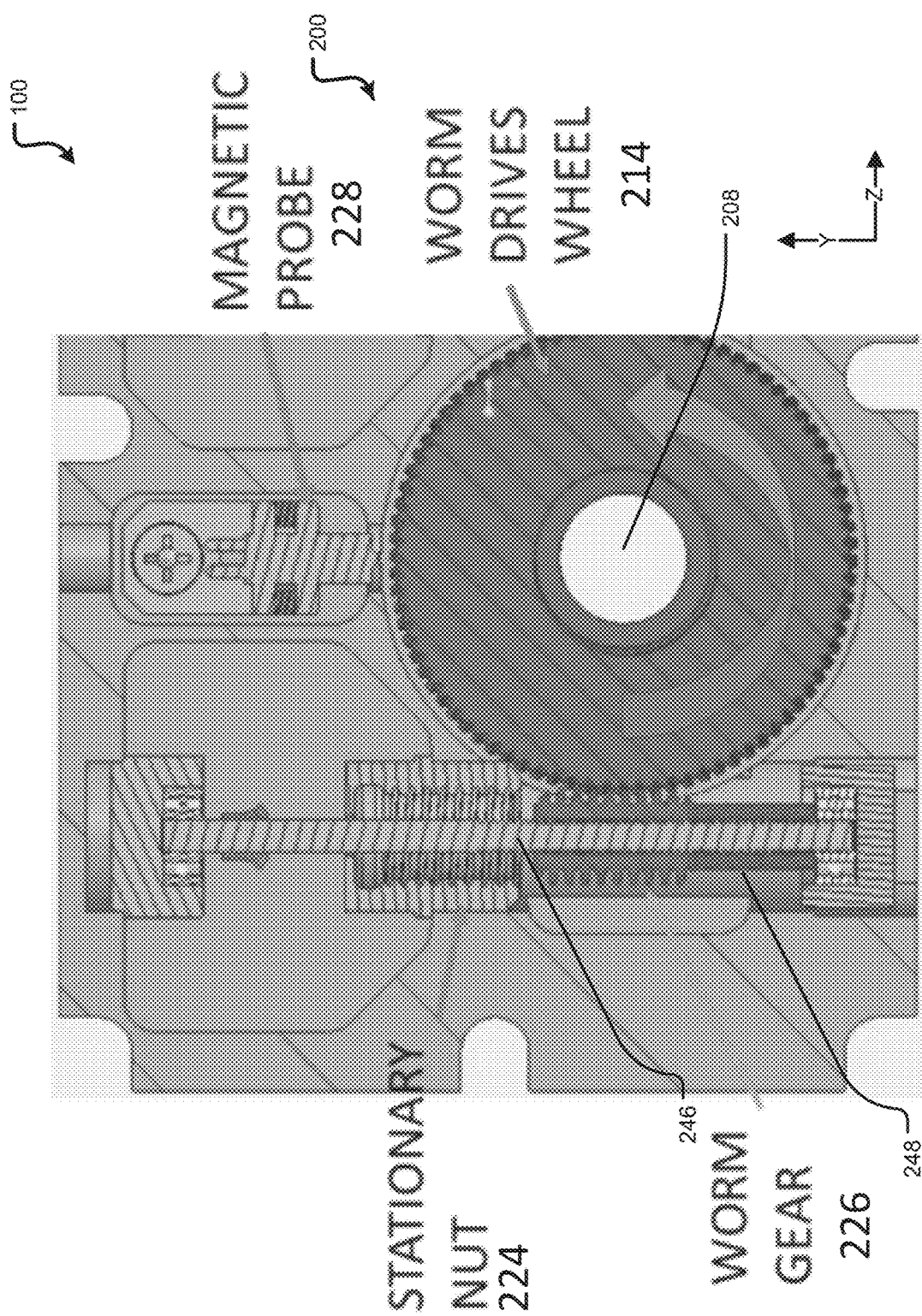
FIG. 6 illustrates a partial cross-sectional view of disengagement of mechanism of the primary lane system of FIG. 4 in disengaging the primary lane mode.

FIG. 6 illustrates a partial cross-sectional view of disengagement mechanism along the lines V-V of the primary lane system of FIG. 4 in disengaging the primary lane mode.

During normal operation of the jam free dual redundant actuator lane changer system 100, the primary lane actuation motor 202 rotates and applies a rotational torque to the primary lane gearbox 204. The primary lane gearbox 204 outputs the rotational torque received from the primary lane actuation motor 202 and applies this rotational torque to the splined internal output shaft 206. The splined internal output shaft 206 transmits the rotational torque through the primary lane splined coupling nut 212 to the splined external output shaft 208. Finally, the splined external output shaft 208 outputs the rotational torque to the component 400.

With reference to FIG. 5, the primary lane system 200 may further include one or more components to transition the primary lane system 200 from the active mode to the disengagement mode. In particular, the one or more components to transition the primary lane system 200 from the active mode to the disengagement mode may include a stationary nut 224, a worm gear 226, and a magnetic probe 228. However, the primary lane system 200 may utilize different components to transition the primary lane system 200 from the active mode to disengagement mode.

Upon detection of a failure or jam of the primary lane system 200 of the jam free dual redundant actuator lane changer system 100, the primary lane disengage motor 210 of the primary lane system 200 may be energized to drive a screw shaft 246. The primary lane disengage motor 210 may be directly connected to the screw shaft 246 or the primary lane disengage motor 210 may be connected to the screw shaft 246 through intervening components. The screw shaft 246 may extend along the y-axis or along the z-axis or along the x-axis through intervening components, i.e. bevel gear, as illustrated in FIG. 5. The screw shaft 246 may be supported along its length thereof by end caps and/or bearings. For example, the one or more bearings may be arranged at each end of the screw shaft 246 along the y-axis. The worm gear 226 may be arranged within a stationary nut 224 that may be arranged around the screw shaft 246.

The screw shaft 246 in response to the primary lane disengage motor 210 may drive the worm gear 226 out of the stationary nut 224. In this case, the stationary nut 224 may act as a "rotational" guide for the worm gear 226. As the screw shaft 246 rotates, since the worm gear 226 is guided on the stationary nut 224, the worm gear 226 may translate linearly along the y-axis while the worm gear 226 rotates. Once the worm gear 226 translates downwardly, the worm gear 226 may engage the wheel 214 as illustrated in FIG. 6. Thereafter, the wheel 214 may start to rotate and the worm gear 226 may continue to move forward and downwardly along the y-axis. When the worm gear 226 moves out the stationary nut 224, three conditions may happen:

Condition 1—If the wheel 214 has less rotating friction than a worm/screw friction, the worm gear 226 may stop moving linearly and may only rotate to drive the wheel 214 to rotate.

Condition 2—The worm gear 226 may keep moving forward while pushing the wheel 214 to engage wheel due to too much rotating friction on the wheel 214, then continue rotating/translating downwardly.

Condition 3—The worm gear 226 rotates while translating forward.

Figure 12:
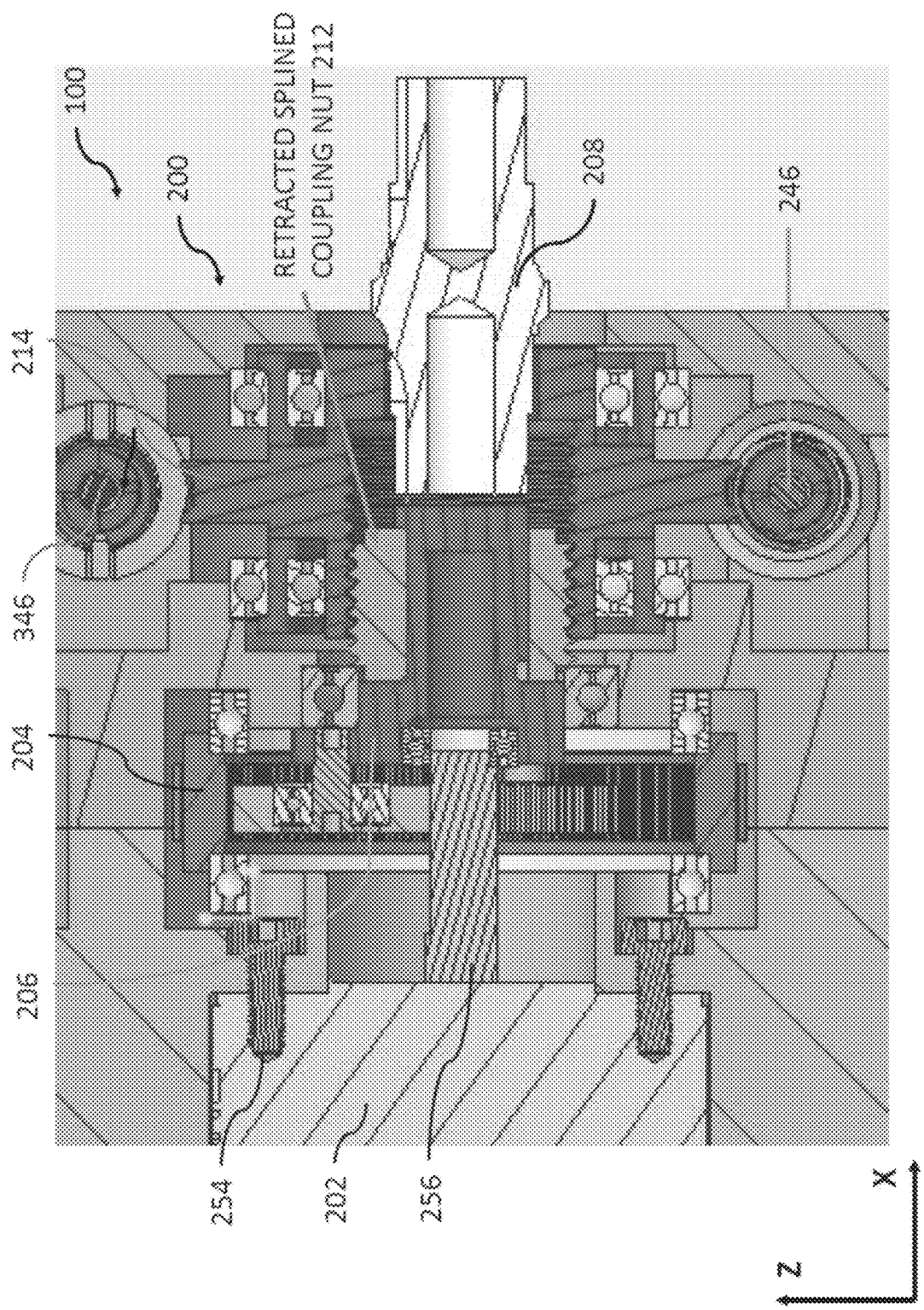
FIG. 12 illustrates cross-sectional view of the primary lane system in jam free mode.

Since there may always be some friction due to the spring 222 on the primary lane splined coupling nut 212, especially in a jam condition, the condition 2 or the condition 3 may most likely happen. Once the worm gear 226 moves to a mechanical stop 248 (fixed linearly but free to rotate about the screw shaft 246), the worm gear 226 may stop moving linearly and rotate to drive the wheel 214 only. With the wheel 214 rotating (as shown by the arrow in FIG. 6), the primary lane splined coupling nut 212 may be forced to move so as to disengage the splined external output shaft 208 as shown in FIG. 12.

Additionally, for Initiated Built-In Test (IBIT) purposes, the worm gear guide of the worm gear 226 may be designed as a stationary nut implementing the stationary nut 224. In this way, the worm gear 226 can move back and forth along the y-axis. The magnetic probe 228 may be arranged and configured for checking the primary lane splined coupling nut 212 engage functionality/disengage functionality.

Accordingly, FIG. 5 and FIG. 6 illustrate various components operating within the jam free dual redundant actuator lane changer system 100 and in particular the primary lane system 200, to transition the primary lane system 200 from an active mode or normal operation configuration where the primary lane system 200 of the jam free dual redundant actuator lane changer system 100 operates the component 400 to a fault tolerance mode or jam free where the primary lane system 200 of the jam free dual redundant actuator lane changer system 100 is disconnected and no longer operates the component 400. In particular, the secondary lane system 300 of the jam free dual redundant actuator lane changer system 100 now controls the component 400.

Figure 7:
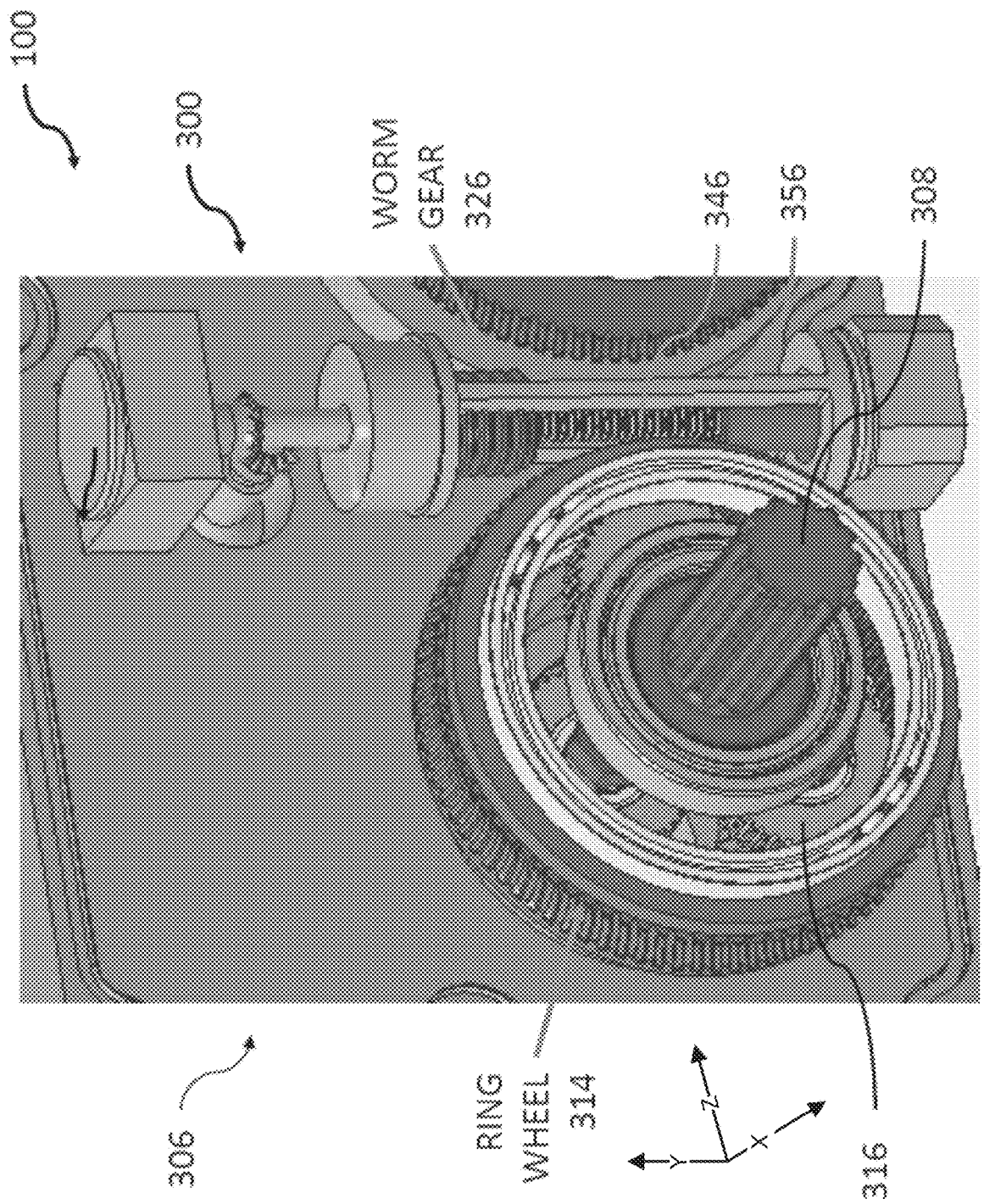
FIG. 7 illustrates a partial perspective end view of a secondary lane system of FIG. 1.

FIG. 7 illustrates a partial perspective end view of a secondary lane system of FIG. 1.

In particular, FIG. 7 illustrates that the secondary lane system 300 is in the primary lane active mode or normal operation configuration. In other words, the secondary lane system 300 of the jam free dual redundant actuator lane changer system 100 is not being utilized to control the component 400. FIG. 7 further illustrates a number of components to transition the secondary lane system 300 of the jam free dual redundant actuator lane changer system 100 into the second configuration. In particular, FIG. 7 illustrates the secondary lane planetary output stage 306 of the secondary lane system 300. More specifically, the secondary lane planetary output stage 306 may include a ring wheel 314, one or more planetary gears 316, and a sun gear 318 (hidden behind the secondary lane output shaft 308 in FIG. 7 illustrated in FIG. 9) connected to the secondary lane output shaft 308. In particular, FIG. 7 illustrates various components operating within the jam free dual redundant actuator lane changer system 100 and in particular the secondary lane system 300, to transition the secondary lane system 300 from the primary lane in an active or normal operation configuration where the secondary lane system 300 of the jam free dual redundant actuator lane changer system 100 is standing by to a fault tolerance or jam free configuration where the secondary lane system 300 of the jam free dual redundant actuator lane changer system 100 is connected and operates the component 400.

For the secondary lane system 300, the one or more planetary gears 316 may be implemented with the ring wheel 314 in free (which decouples the output from the input). This allows the secondary lane output shaft 308 of the secondary lane system 300 to be back-driven. An outside diameter of the ring wheel 314 may have teeth to work with a worm gear 326. An inside diameter of the ring wheel 314 may engage the one or more planetary gears 316 and the one or more planetary gears 316 may engage the sun gear 318 (see FIG. 9). Additionally, the one or more planetary gears 316 may engage the ring gear 322 arranged on an inside diameter of the ring wheel 314.

Similar to the primary lane system 200, the secondary lane system 300 may include a screw shaft 346 driving a worm gear 326 to engage the ring wheel 314. The difference from the primary lane system 200 may be the implementation of the worm gear guide that may be a "blade or sleeve" 356 instead of "stationary nut" shown in FIG. 7.

The screw shaft 346 may extend along the y-axis as illustrated in FIG. 7. The screw shaft 346 may supported along its length thereof. Additionally, the screw shaft 346 may be supported by one or more bearings. For example, the one or more bearings may be arranged at each end of the screw shaft 346 along the y-axis. The screw shaft 346 may drive the worm gear 326 along the blade 356, which acts as a guide. As the screw shaft 346 rotates, the worm gear 326 may translate linearly downwardly along the y-axis while the screw shaft 346 rotates.

Figure 10:
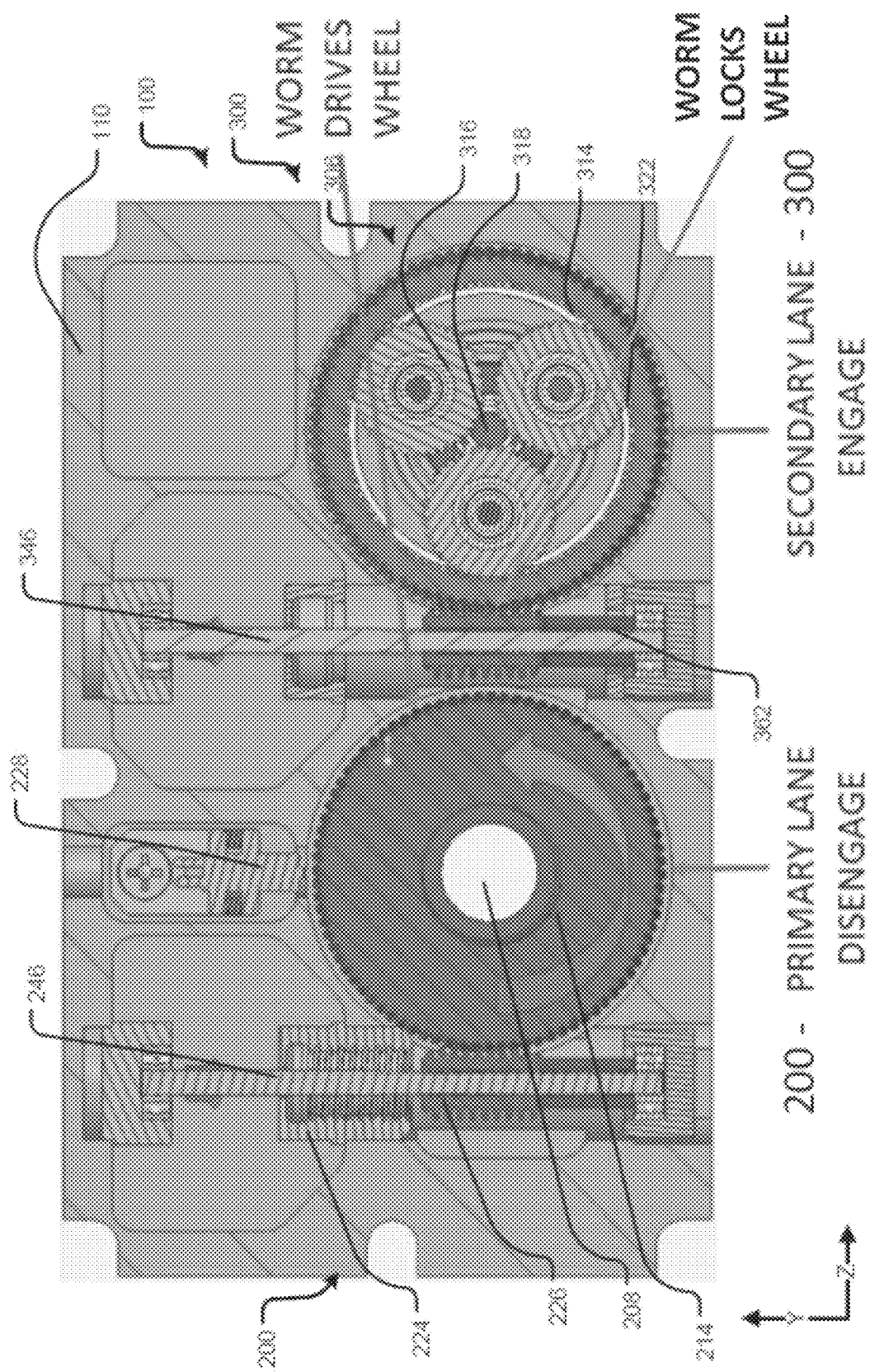
FIG. 10 illustrates a partial end view of the jam free dual redundant actuator lane changer system according to FIG. 1 in secondary lane holding position and primary lane disengaging mode.
Figure 11:
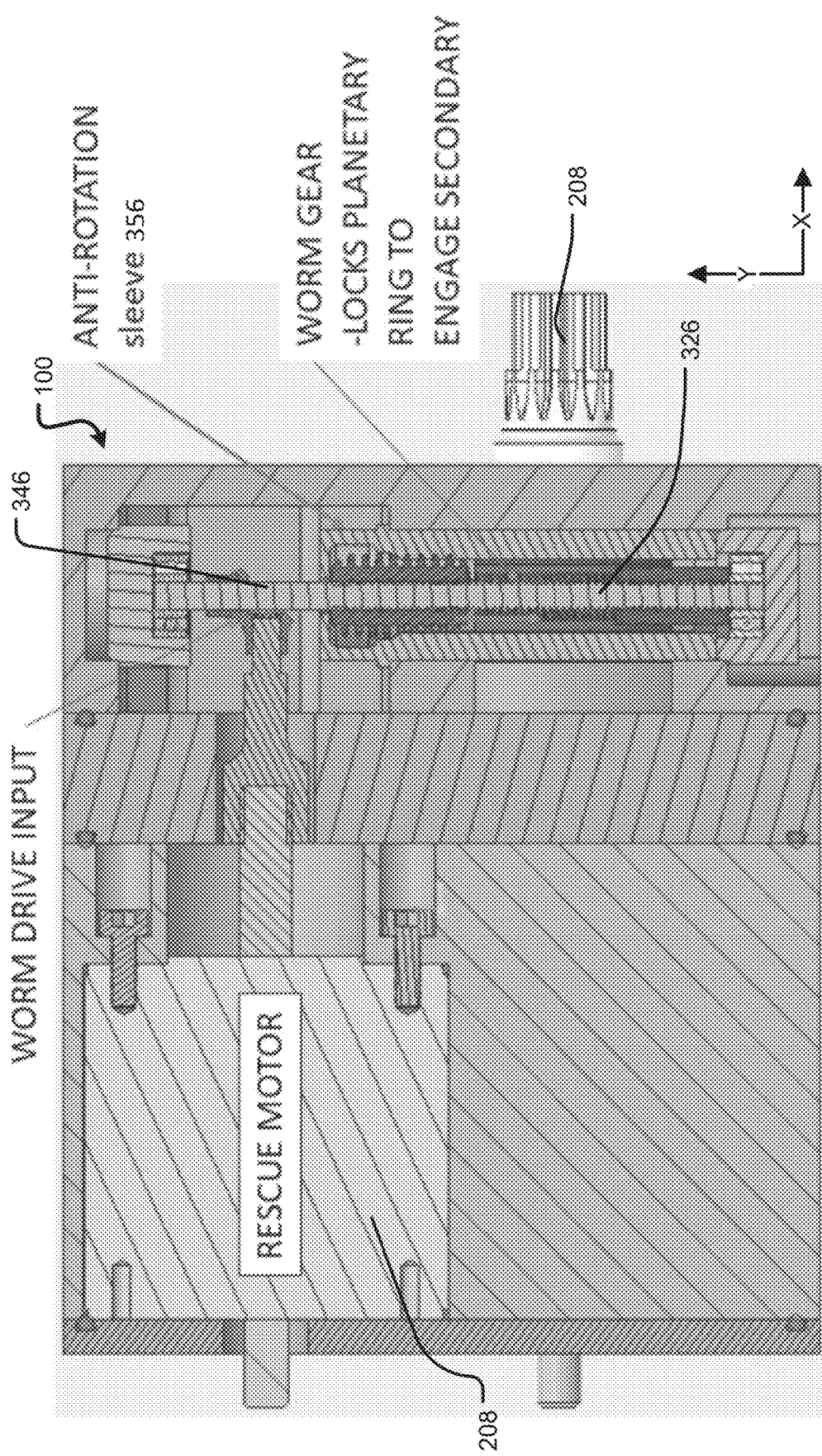
FIG. 11 illustrates a partial cross-sectional view of the jam free dual redundant actuator lane changer system according to FIG. 1 in secondary lane standby mode.

In the event of the primary lane system 200 being jammed, the secondary lane engage motor 312 may drive the screw shaft 346, which may drive the worm gear 326. An anti-rotation guide or anti-rotation sleeve 356 as illustrated in FIG. 11 may cause the worm gear 326 to translate linearly and engage with the ring wheel 314 as illustrated in FIG. 10. In particular, the worm gear 326 may translate until it engages a mechanical stop 362. A signal either from a limit switch, a stall current, and/or the like may indicate the ring wheel 314 being engaged.

Figure 8:
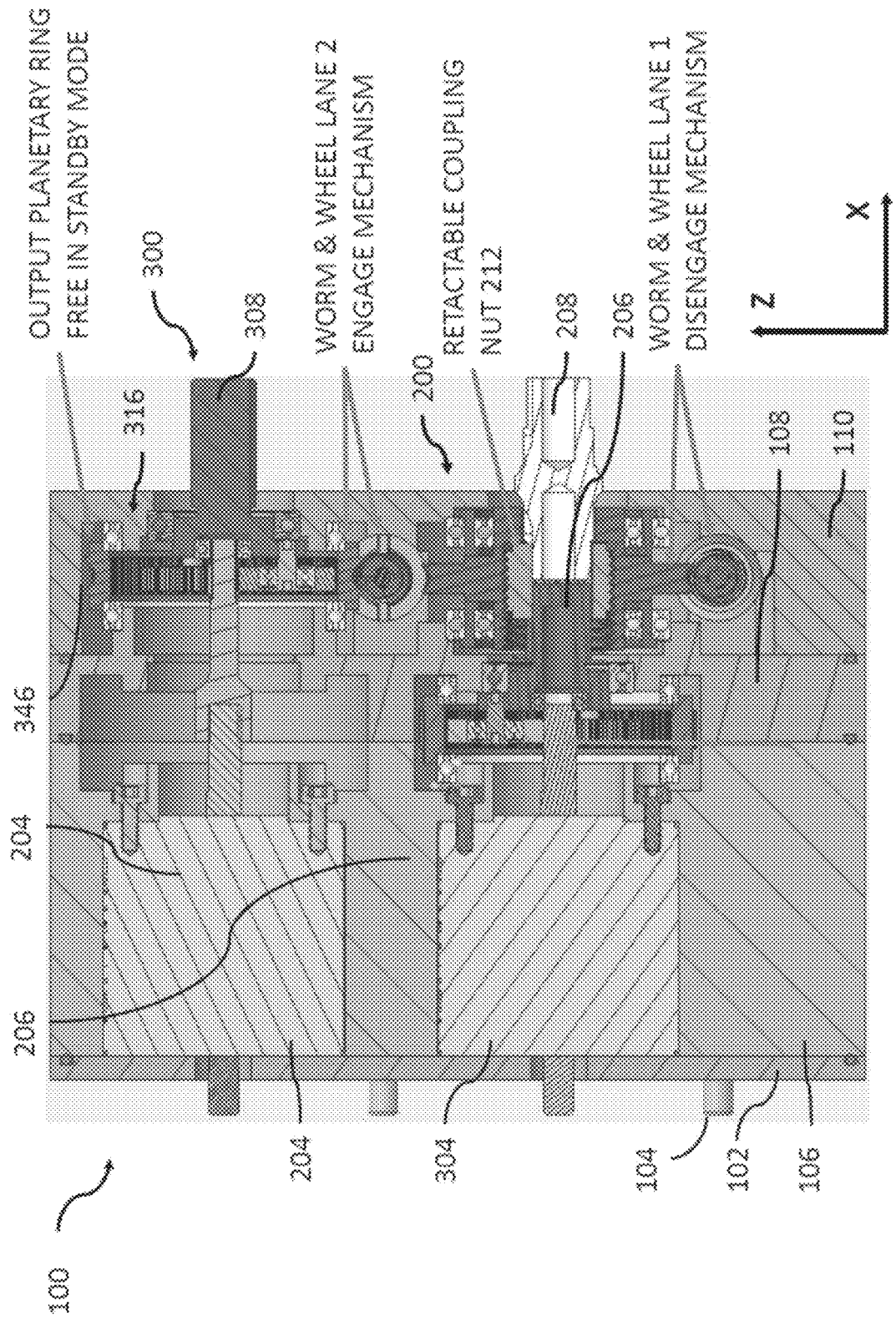
FIG. 8 illustrates a partial top cross-sectional view of the jam free dual redundant actuator lane changer system according to FIG. 1.

FIG. 8 illustrates a partial top cross-sectional view of the jam free dual redundant actuator lane changer system according to FIG. 1.

Figure 9:
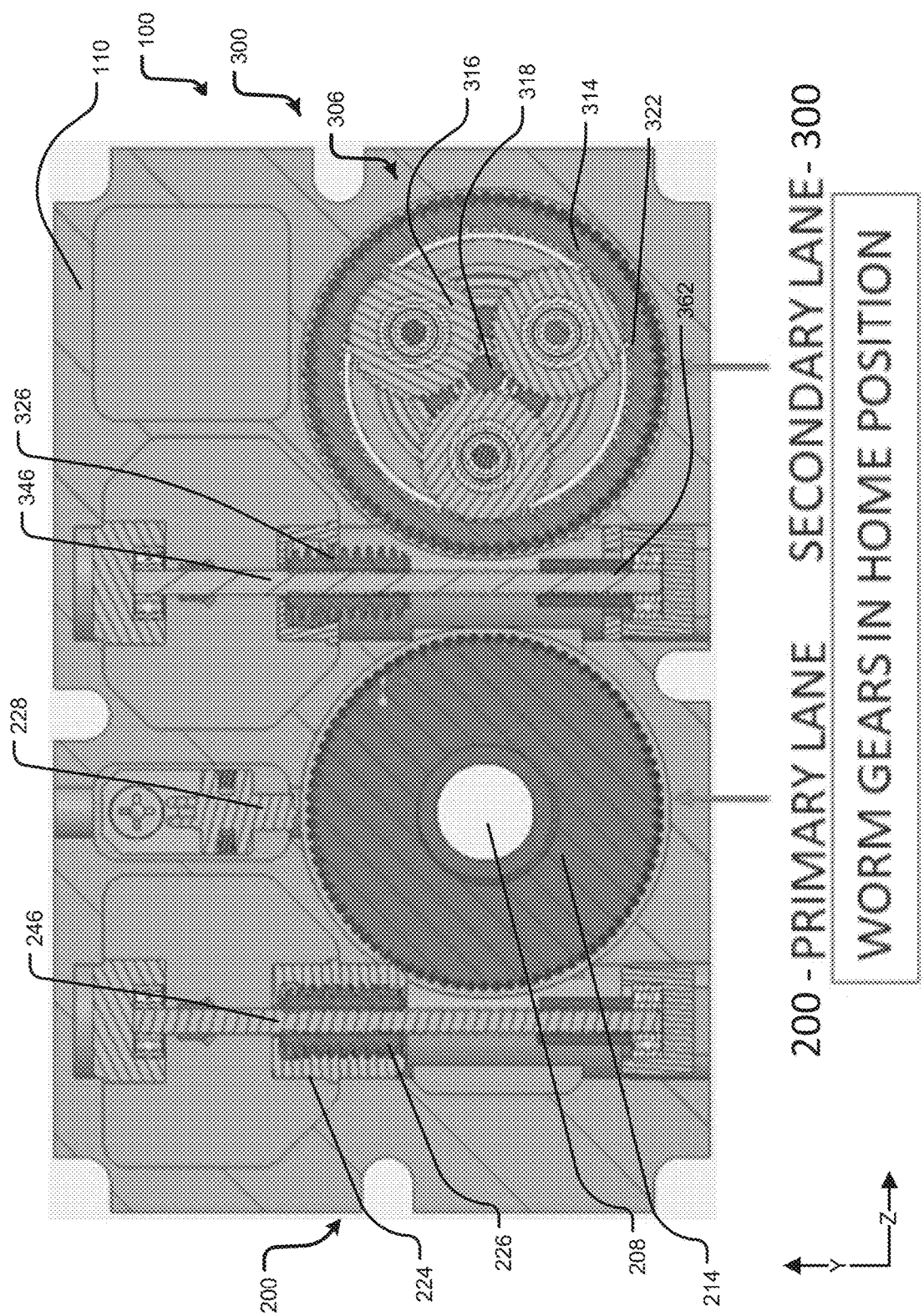
FIG. 9 illustrates a partial end view of the jam free dual redundant actuator lane changer system according to FIG. 1 in primary lane operating and secondary lane standby mode.

FIG. 9 illustrates a partial end view of the jam free dual redundant actuator lane changer system according to FIG. 1 in primary lane active mode.

FIG. 10 illustrates a partial end view of the jam free dual redundant actuator lane changer system according to FIG. 1 in fault tolerance or jam free condition.

FIG. 11 illustrates a partial cross-sectional view of the jam free dual redundant actuator lane changer system according to FIG. 1 in the process of the second lane in engaging mode.

FIG. 12 illustrates cross-sectional view of the primary lane system being disengaged in the fault tolerance or jam free condition.

With reference to FIG. 8, under normal operating conditions, the jam free dual redundant actuator lane changer system 100 is in an active mode and operates such that the primary lane system 200 is active, driving the output of the primary lane actuation motor 202 through the secondary lane gearbox 304, the splined internal output shaft 206, the primary lane splined coupling nut 212, and the splined external output shaft 208 to the component 400. Under normal operating conditions, the secondary lane output shaft 308 of the secondary lane system 300 is in a standby mode and is disengaged because the one or more planetary gears 316 may be free allowing the primary lane system 200 to be easily back-driven through the component 400 by the primary lane system 200.

However, when a failure of the primary lane system 200 occurs, for example, failure of any one or more of the primary lane actuation motor 202 the primary lane gearbox 204, a gear train, the primary lane gearbox 204, and/or the like, the failure may be detected via a sensor as described herein, a controller as described herein, an output sensor, a motor current monitoring, and/or the like. When the failure is detected, a flight computer, a central maintenance system (CMS) a flight management system (FMS), a flight warning system (FWS), and/or the like may energize the secondary lane engage motor 312 to engage the ring wheel 314 and energize the secondary lane actuator motor 302 to hold position. In particular, the secondary lane engage motor 312 may drive the screw shaft 346 to drive the worm gear 326 down to the mechanical stop 362 and bring the worm gear 326 into engagement with the ring wheel 314 as shown from FIG. 9 to FIG. 10. In particular, the ring wheel 314 may engage the secondary lane actuator motor 302 and the secondary lane gearbox 304 to provide output to the secondary lane output shaft 308.

The primary lane disengage motor 210 of the primary lane system 200 may initiate the primary lane system 200 disconnect mechanism. This mechanism may include the screw shaft 246, the worm gear 226, the mechanical stop 248, which may be a bearing mounted, the wheel 214, which may be driven by the worm gear 226 with an internal thread, the primary lane splined coupling nut 212 (which travels when the wheel 214 is rotated) and which may engage the splined internal output shaft 206, the splined external output shaft 208, and/or the like.

As the screw shaft 246 is rotated, the screw shaft 246 may drive the worm gear 226 from its home position (unengaged) as illustrated in FIG. 5 down to engage the wheel 214 as illustrated in FIG. 6. While the screw shaft 246 keeps rotating, the worm gear 226 may rotate and may travel depending on the friction load. Eventually, the worm gear 226 may engage the mechanical stop 248. When the worm gear 226 contacts the mechanical stop 248, the worm gear 226 may be forced to rotate and drive the wheel 214.

As the wheel 214 turns, an internal thread (of the wheel 214) may cause the primary lane splined coupling nut 212 to translate axially as illustrated in FIG. 12. The primary lane splined coupling nut 212 may move until it reaches a mechanical stop, at which time the primary lane splined coupling nut 212 may be fully disengaged from the splined external output shaft 208 to alleviate the jam condition. In other words, the primary lane system 200 of the jam free dual redundant actuator lane changer system 100 has been operated in response to a jam condition to transition from the normal operation or active mode in order for the primary lane system 200 to be disconnected from the jam free dual redundant actuator lane changer system 100. Thereafter, the secondary lane system 300 of the jam free dual redundant actuator lane changer system 100 may connect to and operate the component 400.

With reference back to FIG. 8, the jam free dual redundant actuator lane changer system 100 may include a first end plate 102, mechanical fasteners 104, a first housing 106, a second housing 108, and a third housing 110. In particular, the first end plate 102 may be arranged between the primary lane gearbox 204 and the primary lane actuation motor 202. A shaft of the primary lane gearbox 204 may extend through the first end plate 102 and connect to the primary lane actuation motor 202. Additionally, the first end plate 102 may be arranged between the secondary lane gearbox 304 and the secondary lane actuator motor 302. A shaft of the secondary lane gearbox 304 may extend through the first end plate 102 and connect to the secondary lane actuator motor 302. The first end plate 102 may include the mechanical fasteners 104 for connecting the first end plate 102 to structure associated with an aircraft, the primary lane actuation motor 202, the secondary lane actuator motor 302, and/or the like.

The first housing 106 may support the primary lane gearbox 204 and/or the secondary lane gearbox 304 as well as other portions of the secondary lane system 300 and the primary lane system 200. The first housing 106 may further receive mechanical fasteners for attaching the first housing 106 to the secondary lane gearbox 304 and the primary lane gearbox 204. The second housing 108 may connect to the first housing 106 and the second housing 108 and may support the secondary lane planetary output stage 306 as well as other portions of the secondary lane system 300 and the primary lane system 200. The third housing 110 may connect to the second housing 108. The third housing 110 may support the secondary lane output shaft 308 and the splined external output shaft 208 as well as other portions of the secondary lane system 300 and the primary lane system 200.

One or more components of the jam free dual redundant actuator lane changer system 100, the primary lane system 200, and/or the secondary lane system 300 as described herein may be formed of various materials including one or more metals, synthetic materials, composite materials, and/or the like. Additionally, one or more of the components of the jam free dual redundant actuator lane changer system 100, the primary lane system 200, and/or the secondary lane system 300 as described herein may be cast, machined, stamped, molded, three dimensionally printed, and/or the like.

Figure 13:
FIG. 13 illustrates a controller according to the disclosure.

FIG. 13 illustrates a controller according to the disclosure.

In particular, FIG. 13 illustrates a controller 500 that may be used with the jam free dual redundant actuator lane changer system 100. The controller 500 may include a processor 502 configured to execute instructions stored on computer readable medium 504. In a particular aspect, the controller 500 may be configured to control operation of the jam free dual redundant actuator lane changer system 100, the primary lane system 200, and/or the secondary lane system 300 during both the normal operation and the failed operation. In particular, the controller 500 may control operation of the jam free dual redundant actuator lane changer system 100 to change from the normal configuration to the failed configuration.

In one aspect, the processor 502 implements a jam free dual-redundant actuator lane changer process 600 as described below. The instructions may include various commands to control components of the jam free dual redundant actuator lane changer system 100. The computer readable medium 504 may be any type of memory known in the art including a non-volatile memory, such as magnetic fixed disk storage, cloud-based memory, flash memory or the like. The processor 502 may also be in communication with other types of memory including random access memory 506 and read-only memory 508. The controller 500 may also include a display 510 that may show various states and indications associated with instructions executed by the processor 502. For example, the display 510 may display a failure of the jam free dual redundant actuator lane changer system 100 and implementation of the secondary lane system 300.

The controller 500 may be in communication with a plurality of input devices 512 and output devices 514. The plurality of input devices 512 may include user or pilot interface devices such as keyboard, mouse, buttons, and/or other peripheral devices to receive a user or pilot input. The user or pilot input may include initiation of the secondary lane system 300.

The plurality of input devices 512 may also include sensors in communication with various components of the jam free dual redundant actuator lane changer system 100, such as position sensors, motion sensors, speed sensors, voltage sensors, current sensor, and/or other detection devices known in the art. In particular, the sensors may include sensors to determine failure of the primary lane system 200.

The plurality of output devices 514 may include various electrical and/or mechanical control devices that may be used to control various components of the jam free dual redundant actuator lane changer system 100, such as switches, electrical and/or electromagnetic relays, actuators, or other components known in the art. In particular, the output devices 514 may control the jam free dual redundant actuator lane changer system 100 to switch from the normal configuration to the field configuration.

Figure 14:
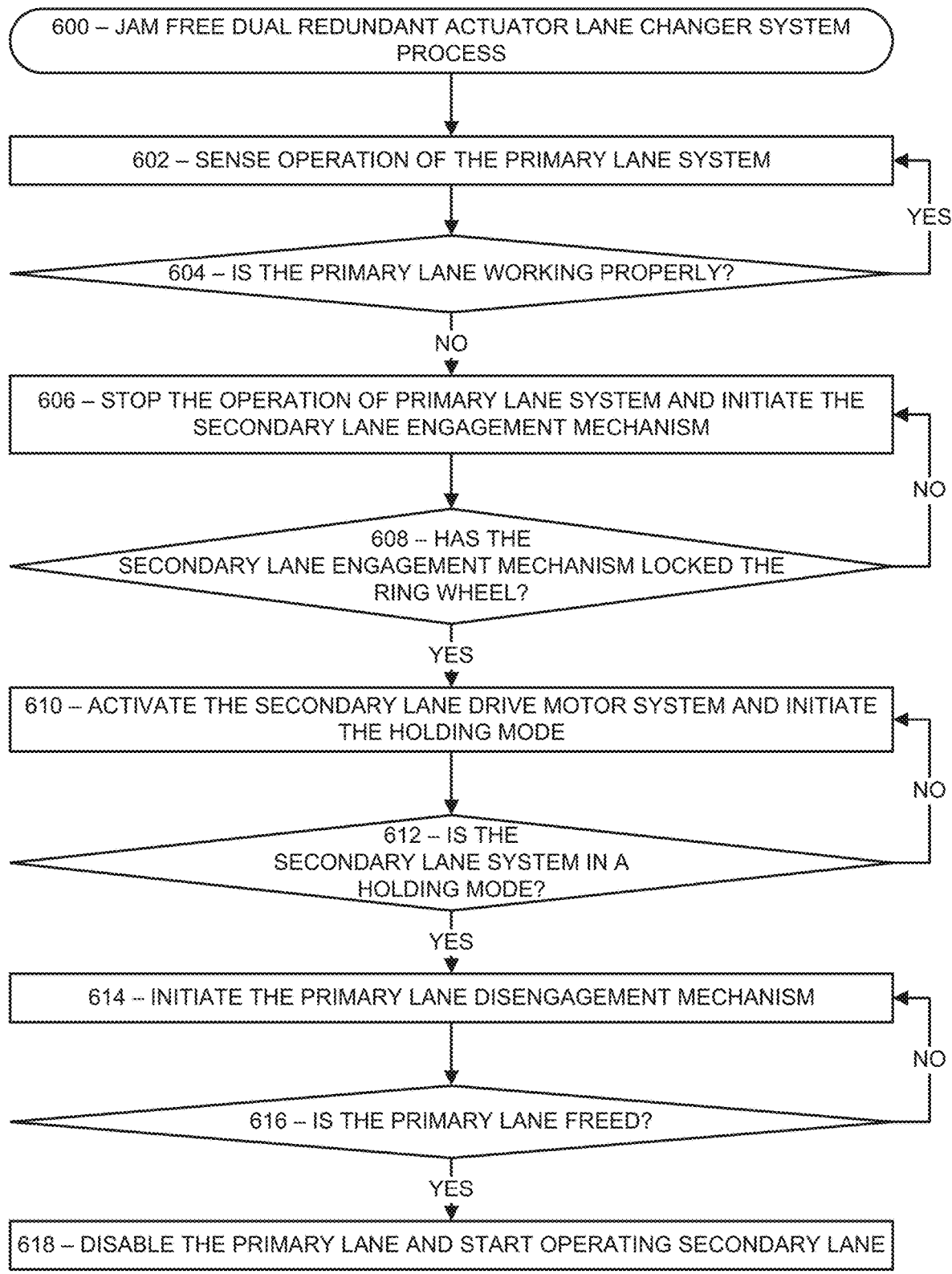
FIG. 14 illustrates a process of operating a jam free dual redundant actuator lane changer system according to FIG. 1.

FIG. 14 illustrates a process of operating a dual redundant actuator lane changer system according to FIG. 1.

FIG. 14 illustrates a process of operating a dual redundant actuator lane changer system according to FIG. 1.

In particular, FIG. 14 illustrates a jam free dual redundant actuator lane changer system process 600 of the jam free dual redundant actuator lane changer system 100. During a normal operation mode of the jam free dual redundant actuator lane changer system 100, the primary lane system 200 may be operated. In other words, the jam free dual redundant actuator lane changer system 100 may be in an active configuration.

With further reference to FIG. 14, the jam free dual redundant actuator lane changer system process 600 may sense operation of the primary lane system 602. In particular, the controller 500 implementing the jam free dual redundant actuator lane changer system process 600 may receive signals from the jam free dual redundant actuator lane changer system 100 to sense the operation of the components associated with the primary lane system 200. For example, the jam free dual redundant actuator lane changer system 100 may be able to detect motion of the primary lane system 200 and/or the component 400 through a sensor as described herein. In particular, a sensor may be used to detect failure of the primary lane system 200.

The jam free dual redundant actuator lane changer system process 600 may determine whether the primary lane is working properly 604. In particular, the controller 500 implementing the jam free dual redundant actuator lane changer system process 600 may determine whether the primary lane system 200 and/or the jam free dual redundant actuator lane changer system 100 is operating properly. If the controller 500 does not sense any problems with either the primary lane system 200 and/or the jam free dual redundant actuator lane changer system 100, the jam free dual redundant actuator lane changer system 100 may continue to operate. The controller 500 may return to step 602 and continue to receive signals from the primary lane system 200 concerning the operation of the jam free dual redundant actuator lane changer system 100.

In some circumstances, the controller 500 may detect a problem in the primary lane system 200 and/or the jam free dual redundant actuator lane changer system 100. For example, a failure within the primary lane system 200 may cause the jam free dual redundant actuator lane changer system 100 to seize or remain static. As a result, the primary lane system 200 may not function properly. When a failure has been detected, the controller 500 operatively coupled to the jam free dual redundant actuator lane changer system 100 may advance to step 606.

Next, the controller 500 may stop the operation of primary lane system and initiate the secondary lane engagement mechanism 606. In particular, the controller 500 and/or the jam free dual redundant actuator lane changer system process 600 may stop operation of the primary lane system 200 and the jam free dual redundant actuator lane changer system process 600 may initiate the secondary lane system 300 as described herein.

The jam free dual redundant actuator lane changer system process 600 may determine whether the secondary lane engagement mechanism has locked the ring wheel 608. In particular, the controller 500 and/or the jam free dual redundant actuator lane changer system process 600 may determine whether the secondary lane system 300 has locked the ring wheel 314 as described herein with respect to FIG. 10. For example, the controller 500 implementing the jam free dual redundant actuator lane changer system process 600 may receive signals from the jam free dual redundant actuator lane changer system 100 to sense the operation of the components associated with the primary lane system 200 and/or the secondary lane system 300 to determine whether the secondary lane system 300 has locked the ring wheel 314.

The jam free dual redundant actuator lane changer system process 600 may activate the secondary lane drive motor system and initiate the holding mode 610. In particular, the controller 500 and/or the jam free dual redundant actuator lane changer system process 600 may activate the secondary lane actuator motor 302.

The jam free dual redundant actuator lane changer system process 600 may determine whether the secondary lane system is in a holding mode 612. For example, the controller 500 implementing the jam free dual redundant actuator lane changer system process 600 may receive signals from the jam free dual redundant actuator lane changer system 100 to sense the operation of the components associated with the primary lane system 200 and/or the secondary lane system 300 to determine whether the secondary lane system is in holding mode 612.

The jam free dual redundant actuator lane changer system process 600 may initiate the primary lane disengagement mechanism 614. In particular, the controller 500 and/or the jam free dual redundant actuator lane changer system process 600 may initiate the primary lane disengagement mechanism that may include implementation of the primary lane disengage motor 210 as described herein.

The jam free dual redundant actuator lane changer system process 600 may determine whether the primary lane has been freed 616. For example, the controller 500 implementing the jam free dual redundant actuator lane changer system process 600 may receive signals from the jam free dual redundant actuator lane changer system 100 to sense the operation of the components associated with the primary lane system 200 and/or the secondary lane system 300 to determine whether the primary lane 200 has been freed.

The jam free dual redundant actuator lane changer system process 600 may disable the primary lane and start operating secondary lane 618. In particular, the controller 500 and/or the jam free dual redundant actuator lane changer system process 600 may disable the primary lane system 200 and start operating the secondary lane system 300.

In some aspects, the controller 500 may signal failure of the jam free dual redundant actuator lane changer system 100 to a flight warning system. For example, a warning message that the secondary lane system 300 has been engaged may be sent to a flight computer, a pilot, a central maintenance system (CMS), a flight management system (FMS), a flight warning system (FWS), a cabin management system, and/or the like. The pilot may be notified via the display 510 or another output device 514 in communication with the controller 500. The controller 500 may provide additional diagnostic information related to the failure to the user or pilot based on information received from the input devices 512. For example, the controller 500 may notify the user or pilot of the type of failure by the jam free dual redundant actuator lane changer system 100.

The jam free dual redundant actuator lane changer system 100 may be configured to utilize outputs from sensing circuits monitored by the controller 500 to operate. The controller 500 may be configured to implement various safety protections for the jam free dual redundant actuator lane changer system 100. The safety protections may include over voltage protection, over current protections, over heat protections, short-circuit protections, and/or like.

In one aspect, the jam free dual redundant actuator lane changer system 100 and/or the controller 500 may operate in response to an aircraft system. The aircraft system may be a central maintenance system (CMS), a flight management system (FMS), a flight warning system (FWS), a cabin management system, or the like.

The jam free dual redundant actuator lane changer system 100 and/or the controller 500 may include Built-in test equipment (BITE). The Built-in test equipment (BITE) may be configured to address fault management and include diagnostic equipment built into airborne systems to support maintenance processes. The Built-in test equipment (BITE) may include sensors, multimeters, oscilloscopes, discharge probes, frequency generators, and/or the like to enable testing and perform diagnostics. The Built-in test equipment (BITE) may include the detection of the fault, the accommodation of the fault (how the system actively responds to the fault), the annunciation or logging of the fault to warn of possible effects and/or aid in troubleshooting the faulty equipment, or the like.

The controller 500 may be configured to process functions, provide other services, and/or the like. The controller 500 may include analog-to-digital converters, digital to analog converters, communication devices, an operating system, a touchscreen controller, a communications component, a graphics component, a contact/motion component, and/or the like to provide full functionality. In particular, the processor 502 may be configured to execute a software application configured to control the jam free dual redundant actuator lane changer system 100. In one aspect, the software application may be configured to interact with sensors, aircraft systems, and/or the like.

The controller 500 and/or the jam free dual redundant actuator lane changer system 100 may further include one or more sensors as described herein to sense a condition of the jam free dual redundant actuator lane changer system 100, an aircraft system, or the like. In particular, the one or more sensors may provide signals to the processor 502. The one or more sensors may include a current sensor, a voltage sensor, temperature sensor, and/or the like.

Accordingly, the jam free dual redundant actuator lane changer system 100 described is configured to implement a redundant system in order to overcome mechanical failures and increase safety, reliability, limit equipment damage, and/or the like. In particular, the jam free dual redundant actuator lane changer system 100 may determine a failure in the primary lane system 200, disconnect the primary lane system 200 from the jam free dual redundant actuator lane changer system 100, and implement the secondary lane system 300 in order to actuate the component 400.

Further in accordance with various aspects of the disclosure, the methods described herein are intended for operation with dedicated hardware implementations including, application specific integrated circuits (ASIC), programmable logic arrays, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A jam free dual redundant actuator lane changer system comprising:
    a primary lane system; and
    a secondary lane system,
    wherein the primary lane system is configured to provide actuation of a component during a normal operation while the secondary lane system remains in a standby configuration;
    wherein the secondary lane system is configured to provide an actuation of the component when the primary lane system fails or jams but freed from its output to the component;
    wherein the primary lane system comprises a primary lane actuation motor and a primary lane gearbox that are configured to provide actuation of the component during the normal operation while the secondary lane system remains in the standby configuration; and
    wherein the primary lane system further comprises a primary lane disengage motor that is configured to disengage the primary lane system from the component when the primary lane system fails or jams.

2. The jam free dual redundant actuator lane changer system according to claim 1 wherein the component is connected to a control surface of an aircraft.

3. The jam free dual redundant actuator lane changer system according to claim 2 wherein the control surface comprises at least one of the following: an aileron, an elevator, a ruddervator, leading-edge flaps, leading-edge slots, ground spoilers, an inboard flap, an inboard aileron, an inboard aileron tab, an outboard flap, a balance tab, an outboard aileron, a flight spoiler, a trim tab, slats, air brakes, an elevator trim, a control horn, a rudder trim, and an aileron trim.

4. The jam free dual redundant actuator lane changer system according to claim 1 wherein the component is connected to a component of an aircraft.

5. The jam free dual redundant actuator lane changer system according to claim 4 wherein the component of an aircraft comprises at least one of the following: thrust reversers, weapons systems, in-flight fueling systems, tail hook arrest systems, landing gear systems, doors, and/or hatches.

6. The jam free dual redundant actuator lane changer system according to claim 1 wherein the primary lane system is configured to transition from the normal operation where the primary lane system of the jam free dual redundant actuator lane changer system operates the component to a fault tolerance or jam free condition where the primary lane system of the jam free dual redundant actuator lane changer system is disconnected and no longer operates the component.

7. The jam free dual redundant actuator lane changer system according to claim 6 wherein the secondary lane system controls the component.

8. The jam free dual redundant actuator lane changer system according to claim 1 further comprising:
    a sensor configured to sense a failure of the primary lane system; and
    a controller configured to control the secondary lane system to provide actuation of the component in response to the sensor sensing the failure of the primary lane system.

9. The jam free dual redundant actuator lane changer system according to claim 1 further comprising: a primary lane system disconnect mechanism that comprises at least one of the following: a screw shaft, a rotational guide, a worm gear, a mechanical stop, a wheel, inner and outer bearings, and a primary lane splined coupling nut.

10. A jam free dual redundant actuator lane changer system comprising:
    a primary lane system; and
    a secondary lane system,
    wherein the primary lane system is configured to provide actuation of a component during a normal operation while the secondary lane system remains in a standby configuration;
    wherein the secondary lane system is configured to provide an actuation of the component when the primary lane system fails or jams but freed from its output to the component;
    wherein the primary lane system comprises a primary lane actuation motor and a primary lane gearbox that are configured to provide actuation of the component during the normal operation while the secondary lane system remains in the standby configuration;

wherein the primary lane system further comprises a splined internal output shaft, a splined external output shaft, and a primary lane splined coupling nut that are configured to provide actuation of the component during the normal operation while the secondary lane system remains in a standby configuration; and wherein the primary lane splined coupling nut having a thread arranged on an outside diameter and an internal spline arranged on an inside diameter.

11. The jam free dual redundant actuator lane changer system according to claim 10 wherein during the normal operation of the jam free dual redundant actuator lane changer system, the primary lane actuation motor rotates and applies a rotational torque to the primary lane gearbox;

the primary lane gearbox outputs the rotational torque received from the primary lane actuation motor and applies this rotational torque to the splined internal output shaft;

the splined internal output shaft transmits the rotational torque through the primary lane splined coupling nut to the splined external output shaft; and the splined external output shaft outputs the rotational torque to the component.

12. A jam free dual redundant actuator lane changer system comprising:

a primary lane system; and a secondary lane system, wherein the primary lane system is configured to provide actuation of a component during a normal operation while the secondary lane system remains in a standby configuration;

wherein the secondary lane system is configured to provide an actuation of the component when the primary lane system fails or jams but freed from its output to the component;

wherein the primary lane system comprises a primary lane actuation motor and a primary lane gearbox that are configured to provide actuation of the component during the normal operation while the secondary lane system remains in the standby configuration; and wherein the primary lane system further comprises a primary lane disengage motor, a splined internal output shaft, a splined external output shaft, and a primary lane splined coupling nut, wherein the primary lane disengage motor is configured to disengage the splined internal output shaft from the splined external output shaft when the primary lane system fails or jams.

13. A jam free dual redundant actuator lane changer system comprising:

a primary lane system; and a secondary lane system, wherein the primary lane system is configured to provide actuation of a component during a normal operation while the secondary lane system remains in a standby configuration;

wherein the secondary lane system is configured to provide an actuation of the component when the primary lane system fails or jams but freed from its output to the component; and wherein the secondary lane system comprises a secondary lane actuator motor, a secondary lane gearbox, and a secondary lane output shaft that are configured to provide actuation of the component when the primary lane system fails or jams but freed from its output to component.

14. The jam free dual redundant actuator lane changer system according to claim 13 wherein the primary lane system comprises a primary lane actuation motor and a primary lane gearbox that are configured to provide actuation of the component during the normal operation while the secondary lane system remains in the standby configuration.

15. The jam free dual redundant actuator lane changer system according to claim 14 wherein the primary lane system further comprises a primary lane disengage motor that is configured to disengage the primary lane system from the component when the primary lane system fails or jams.

16. The jam free dual redundant actuator lane changer system according to claim 13 wherein the secondary lane system further comprises a secondary lane planetary output stage, a secondary lane engagement gear, and a secondary lane engage motor that are configured to connect the secondary lane system to the component when the primary lane system fails or jams.

17. The jam free dual redundant actuator lane changer system according to claim 16 wherein the secondary lane planetary output stage comprises a ring wheel, one or more planetary gears, and a sun gear connected to the secondary lane output shaft.

18. A jam free dual redundant actuator lane changer system comprising:

a primary lane system;

a secondary lane system;

the primary lane system is configured to provide actuation of a component during a normal operation while the secondary lane system remains in a standby configuration;

a sensor configured to sense a failure of the primary lane system; and a controller configured to control the secondary lane system to provide actuation of the component in response to the sensor sensing the failure of the primary lane system, wherein the primary lane system comprises a primary lane actuation motor and a primary lane gearbox that are configured to provide actuation of the component during the normal operation while the secondary lane system remains in the standby configuration;

wherein the primary lane system further comprises a splined internal output shaft, a splined external output shaft, and a primary lane splined coupling nut that are configured to provide actuation of the component during the normal operation while the secondary lane system remains in a standby configuration; and wherein the primary lane splined coupling nut having a thread arranged on an outside diameter and an internal spline arranged on an inside diameter.

19. The jam free dual redundant actuator lane changer system according to claim 18 wherein the primary lane system is configured to transition from the normal operation where the primary lane system of the jam free dual redundant actuator lane changer system operates the component to a second configuration where the primary lane system of the jam free dual redundant actuator lane changer system is disconnected and no longer operates the component.

20. The jam free dual redundant actuator lane changer system according to claim 19 wherein the secondary lane system controls the component.

21. The jam free dual redundant actuator lane changer system according to claim 18 wherein the secondary lane system comprises a secondary lane actuator motor, a secondary lane gearbox, and a secondary lane output shaft that are configured to provide actuation of the component when the primary lane system fails or jams.

22. The jam free dual redundant actuator lane changer system according to claim 18 further comprising: a primary lane system disconnect mechanism that comprises at least one of the following: a screw shaft, a rotational guide, a worm gear, a mechanical stop, a wheel, inner and outer bearings, and a primary lane splined coupling nut.

23. The jam free dual redundant actuator lane changer system according to claim 18 wherein the component is connected to a control surface of an aircraft.

24. The jam free dual redundant actuator lane changer system according to claim 23 wherein the control surface comprises at least one of the following: an aileron, an elevator, a ruddervator, leading-edge flaps, leading-edge slots, ground spoilers, an inboard flap, an inboard aileron, an inboard aileron tab, an outboard flap, a balance tab, an outboard aileron, a flight spoiler, a trim tab, slats, air brakes, an elevator trim, a control horn, a rudder trim, and an aileron trim.

25. The jam free dual redundant actuator lane changer system according to claim 18 wherein the component is connected to a component of an aircraft.

26. The jam free dual redundant actuator lane changer system according to claim 25 wherein the component of an aircraft comprises at least one of the following: thrust reversers, weapons systems, in-flight fueling systems, tail hook arrest systems, landing gear systems, doors, and/or hatches.

27. A jam free dual redundant actuator lane changer system comprising:
a primary lane system;
a secondary lane system;
the primary lane system is configured to provide actuation of a component during a normal operation while the secondary lane system remains in a standby configuration;
a sensor configured to sense a failure of the primary lane system; and
a controller configured to control the secondary lane system to provide actuation of the component in response to the sensor sensing the failure of the primary lane system,
wherein the primary lane system comprises a primary lane actuation motor and a primary lane gearbox that are configured to provide actuation of the component during the normal operation while the secondary lane system remains in the standby configuration; and
wherein the primary lane system further comprises a primary lane disengage motor, a splined internal output shaft, a splined external output shaft, and a primary lane splined coupling nut, wherein the primary lane disengage motor is configured to disengage the splined internal output shaft from the splined external output shaft when the primary lane system fails or jams.

28. A jam free dual redundant actuator lane changer system comprising:
a primary lane system;
a secondary lane system;
the primary lane system is configured to provide actuation of a component during a normal operation while the secondary lane system remains in a standby configuration;
a sensor configured to sense a failure of the primary lane system; and
a controller configured to control the secondary lane system to provide actuation of the component in response to the sensor sensing the failure of the primary lane system,
wherein the secondary lane system comprises a secondary lane actuator motor, a secondary lane gearbox, and a secondary lane output shaft that are configured to provide actuation of the component when the primary lane system fails or jams; and
wherein the secondary lane system further comprises a secondary lane planetary output stage, a secondary lane engagement gear, and a secondary lane engage motor that are configured to connect the secondary lane system to the component when the primary lane system fails or jams.

29. The jam free dual redundant actuator lane changer system according to claim 28 wherein the primary lane system comprises a primary lane actuation motor and a primary lane gearbox that are configured to provide actuation of the component during the normal operation while the secondary lane system remains in the standby configuration.

30. The jam free dual redundant actuator lane changer system according to claim 29 wherein the primary lane system further comprises a primary lane disengage motor that is configured to disengage the primary lane system from the component when the primary lane system fails or jams.

31. The jam free dual redundant actuator lane changer system according to claim 29 wherein:
the primary lane system further comprises a splined internal output shaft, a splined external output shaft, and a primary lane splined coupling nut that are configured to provide actuation of the component during the normal operation while the secondary lane system remains in a standby configuration; and
the primary lane splined coupling nut having a thread arranged on an outside diameter and an internal spline arranged on an inside diameter.

32. The jam free dual redundant actuator lane changer system according to claim 31 wherein during the normal operation of the jam free dual redundant actuator lane changer system, the primary lane actuation motor rotates and applies a rotational torque to the primary lane gearbox;
the primary lane gearbox outputs the rotational torque received from the primary lane actuation motor and applies this rotational torque to the splined internal output shaft;
the splined internal output shaft transmits the rotational torque through the primary lane splined coupling nut to the splined external output shaft; and
the splined external output shaft outputs the rotational torque to the component.

33. The jam free dual redundant actuator lane changer system according to claim 28 wherein the secondary lane planetary output stage comprises a ring wheel, one or more planetary gears, and a sun gear connected to the secondary lane output shaft.

* * * * *